March 7, 1967

J. V. DAVIS ET AL 3,307,720

CONVEYING APPARATUS INCORPORATING ROTARY TRANSFER MECHANISM

Filed June 10, 1964

INVENTORS.
John V. Davis
Louis J. Minbiole, Jr.
Eugene H. Zinke
BY Harness, Dickey & Pierce
ATTORNEYS.

United States Patent Office 3,307,720
Patented Mar. 7, 1967

3,307,720
CONVEYING APPARATUS INCORPORATING ROTARY TRANSFER MECHANISM
John V. Davis, Grosse Pointe Farms, Louis J. Minbiole, Jr., Detroit, and Eugene H. Zinke, Roseville, Mich., assignors to The Udylite Corporation, a corporation of Delaware
Filed June 10, 1964, Ser. No. 374,125
4 Claims. (Cl. 214—89)

The present invention broadly pertains to work-handling apparatus, and more particularly to an improved electroplating apparatus of the straight-line type employing one or a plurality of sections each provided with one or a plurality of shuttle carriages and interconnected at their input and output ends by a rotary transfer mechanism. The conveying apparatus comprising the present invention consists of an improvement to the conveying machine as disclosed in United States patent application Serial No. 235,310, filed November 5, 1962, now Patent No. 3,252,603, and assigned to the same assignee as the present invention.

Work-handling apparatuses of the general type to which the present invention is applicable are in widespread commercial use for automatically transporting workpieces between successive manufacturing operations. Conveying apparatuses of this type are particularly suitable for conveying workpieces automatically through a sequentially phased chemical treating process which may conventionally include one or more electrochemical or electroplating operations. In conveying apparatus of the so-called straight-line types, the workpieces are conventionally loaded at one end of the machine and are conveyed through the series of treating stations and are subsequently unloaded from the opposite end thereof. In accordance with the conveying apparatus as disclosed in the aforementioned pending United States patent application, a shuttle carriage is employed having a plurality of independently movable lift mechanisms thereon which are selectively operable in accordance with a preselected cycle and in response to intermittent movement of the carriage along the treating stations to effect a successive transfer of the work racks on which the workpieces are supported through a series of aligned treating stations. The operation of the shuttle carriage and of the lift mechanisms thereon can be automatically programmed to provide a preselected treating time of the workpieces at each of the various treating stations and can also operate to return the workpieces at the completion of their treating cycle to the input end of the conveying machine.

The increasing complexity and the number of processing steps required in modern electroplating operations has occasioned a corresponding increase in the complexity and size of conveying apparatus employed in the process. Modern electroplating or other treating processes also require a high degree of flexibility and versatility in the conveying apparatus so as to provide for variations in the treatment of selected ones of the workpieces which are concurrently being processed with the remaining workpieces. The provision of such added flexibility and versatility serves to still further complicate the structure of the conveying apparatus to accommodate such variations in the processing cycle.

It is, accordingly, a principal object of the present invention to provide an improved conveying apparatus including at least one straight-line section and at least one rotary transfer mechanism which are operatively associated and coordinated in operation, providing therewith a simplified and more versatile movement of the workpieces or the work racks on which the workpieces are supported through the standard cycle as well as variations of the standard processing cycle.

Another object of the present invention is to provide an improved conveying apparatus including at least one straight-line section and at least one rotary transfer mechanism disposed at one end of the conveying section which are operatively coordinated together, facilitating the loading, unloading, and conveyance of the work racks through the processing cycle as well as variations in the standard cycle.

Still another object of the present invention is to provide an improved conveying apparatus incorporating a rotary transfer mechanism which enables withdrawal of selected work carriers at selected points of the processing cycle and transfer thereof to alternative processing cycles as desired, substantially increasing the efficiency and versatility of the conveying apparatus.

A further object of the present invention is to provide an improved integrated conveying apparatus which is of simple design, of durable and reliable operation, and of economical manufacture and control.

The foregoing and other objects and advantages of the present invention are achieved by providing rail means disposed in longitudinal alignment with an aligned series of treating stations on which one or a plurality of shuttle carriages are movably mounted which include one or more lift mechanisms thereon for engaging and transferring the work racks through the treating stations. At least one rotary transfer mechanism is disposed at at least one end of the aligned series of treating stations and is operable to rotate in operative coordinated sequence relative to the movement of the carriage along the rail means and the transfer of work racks by the lift means thereon effecting coordinated movement of the work racks to and from the ends of the processing machine.

Other objects and advantages of the present invention will become apparent from the following detailed description taken in conjunction with the accompanying drawings, wherein.

Figure 1:
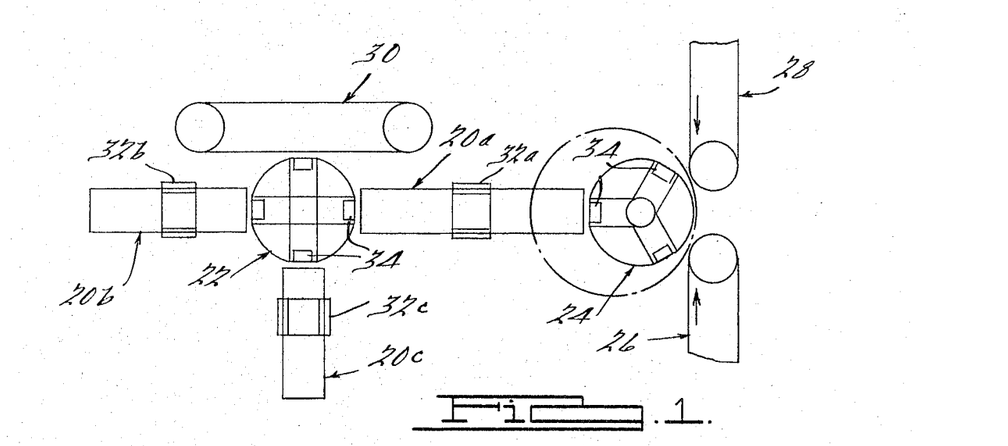
FIGURE 1 is a schematic plan view of an exemplary arrangement of three conveying sections and two operatively associated rotary transfer mechanisms in combination with three shop conveyors.

Referring now in detail to the drawings, and as may be best seen in FIGURE 1, an exemplary arrangement of a conveying apparatus incorporating rotary transfer mechanisms is illustrated which is suitable for use such as, for example, in an electroplating operation. The conveying machine as schematically illustrated comprises three straight-line machine sections 20a, 20b and 20c which are interconnected at one of their ends by a rotary transfer mechanism indicated at 22. The right end of the machine section 20a as viewed in FIGURE 1, is serviced by and coordinated with the movement with a rotary load-unload transfer mechanism indicated at 24 which in turn is operatively associated with a load shop conveyor 26 and an unloading shop conveyor 28. A third shop conveyor 30 is disposed adjacent to the rotary transfer mechanism 22 to which selected ones of the work racks conveyed through the principal conveying machine may be transferred as desired to undergo repair or an alternative treating cycle.

Each of the machine sections 20a, 20b and 20c is provided with a shuttle carriage indicated at 32a, 32b and 32c, respectively, which is operable to transfer the work racks through the several treating stations of each machine section and thereafter transfer the racks to or from the associated rotary transfer mechanisms, such as the mechanisms 22 and 24. The rotary transfer mechanisms 22 and 24 are provided with a plurality of work rack supporting stations which are disposed at substantially equal circumferential increments therearound and are operative on energization in coordination with the movement of the several shuttle carriages to arcuately move the work racks into and out of end alignment with the ends of the several machine sections.

In the exemplary arrangement shown in FIGURE 1, the rotary transfer mechanism 24 is formed with three work-supporting stations disposed 120° apart for supporting a work rack such as schematically indicated at 34 at each of three arcuately spaced stations. One station, designated as an unload station in FIGURE 1, is serviced by the unloading shop conveyor 28 whereby the workpieces having completed a prescribed treating cycle are transferred from the work rack 34 to the unloading shop conveyor 28 where they are transferred to the next manufacturing operation. In lieu of performing a loading or unloading operation at these stations, it is also contemplated that a process operation can be performed at such stations, for example, by providing a circular tank into which the workpieces are immersed. The rotary transfer mechanism 24 is thereafter indexed in coordination with the operation of the shuttle carriages of the several machine sections to place the unloaded work rack 34 adjacent to a load station as designated in FIGURE 1 whereby a fresh supply of unprocessed workpieces supplied by the load shop conveyor 26 are loaded on the work rack. At the completion of the loading cycle, and in coordination with the adjacent machine section 20a, the rotary transfer mechanism 24 is again rotated in a clockwise direction as viewed in FIGURE 1 whereupon the loaded work rack 34 is positioned in end alignment adjacent to the end of the machine section 20a. In this position, the loaded work rack 34 is removed from the rotary transfer mechanism 24 by the shuttle carriage 32a, and is advanced through one or more of the treating stations provided along the machine section 20a. At the completion of a prescribed treating sequence, the shuttle carriage 32a is operative to either return the work rack to the vacated station on the rotary transfer mechanism 24 or, alternatively, to transfer the work rack and the workpieces therein to a vacated station on the rotary transfer mechanism 22 positioned at the opposite end of the machine section 20a.

The rotary transfer mechanism 22, as illustrated in FIGURE 1, is formed with four work rack supporting stations disposed at circumferential increments of 90°. Rotation of the rotary transfer mechanism 22 is controlled in operative association with the several machine sections and is effective to angularly transfer in a clockwise direction, as viewed in FIGURE 1, the work rack 34 from the end of the machine section 20a to the input end of the machine section 20c. From there, the work rack may be removed by the shuttle carriage 32c and transferred through one or all of the treating stations incorporated therein. The processed work rack is thereafter returned to a vacated position on the rotary transfer mechanism 22 whereupon it is angularly transferred to 90° to a position adjacent to the input end of the machine section 20b. The work rack 34 may thereafter be removed by the shuttle carriage 32b and advanced through one or a series of the treating stations provided by machine section 20b. At the completion of this treating section, the work rack 34 is redeposited at a vacated station on the rotary transfer mechanism 22 from which it is angularly advanced to a station adjacent to the shop conveyor 30.

Depending on the prescribed treating sequence to which the workpieces contained in the work rack 34 are to undergo, the work rack 34 or a portion of the workpieces therein may be selectively transferred to the shop conveyor 30 whereupon they undergo a preselected treating sequence. The shop conveyor 30 may also serve as a repair station to which selected ones of the work racks 34 are transferred which are in need of either adjustment or repair of one or more of the components thereof. The work rack 34 is thereafter replaced on a vacant station of the rotary transfer mechanism 22 on completion of its travel on the shop conveyor 30 and is angularly transferred to a position adjacent to the left-hand end of the machine section 20a as viewed in FIGURE 1. The shuttle carriage 32a is operative to remove the work rack 34 and redeposit it on a vacated station on the rotary transfer mechanism 24 located at the opposite end of the machine section. The work rack 34 containing workpieces which have completed the treating cycle is thereafter transferred to the load station at which the workpieces are removed from the work rack. Accordingly, the cycle continues in a manner as hereinbefore described in accordance with the exemplary arrangement illustrated in FIGURE 1.

It will be appreciated from the foregoing description that enhanced flexibility and processing versatility is achieved by virtue of the conveying machine comprising the present invention including the operatively associated straight-line machine sections and rotary transfer mechanisms. The exemplary arrangement illustrated is applicable, for example, to an electroplating process wherein machine section 20a may comprise a series of pre-cleaning stations after which the cleaned workpieces are transferred to an electroplating operation as provided by the treating stations embodied in machine section 20c. At the completion of the electroplating cycle, the workpieces may be transferred from the electroplating machine section 20c to the machine section 20b at which an after-treatment such as rinsing, a second overplating, or the like, of the workpieces takes place. It is also possible to provide one or more additional machine sections similar to the sections 20a, 20b, 20c to which selected ones of the work racks are transferred so as to attain a heavier plate than that deposited on others of the workpieces. Such additional machine sections can be provided in the general scheme as illustrated in FIGURE 1 by providing a rotary transfer mechanism such as the mechanism 22 with more than four rack-supporting stations which in turn are adapted to be disposed in end-aligning relationship relative to such additional machine sections or alternatively incorporating one or more additional rotary transfer mechanisms at the ends of one or more of the machine sections. In either event, the conveying apparatus in accordance with the present invention provides for an almost unlimited variation in the pattern of work flow and, additionally, facilitates a physical disposition of the apparatus so as to provide for optimum utilization of plant facilities and a more effective materials handling.

Figure 2:
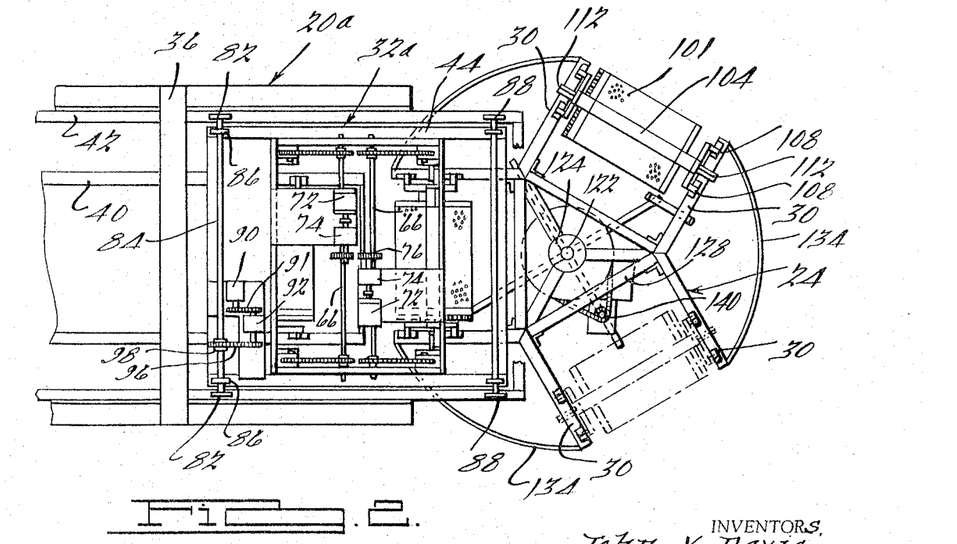
FIGURE 2 is an enlarged fragmentary plan view of a portion of the conveying machine illustrated in FIGURE 1 and encircled in the dotted line indicated at 2.
Figure 3:
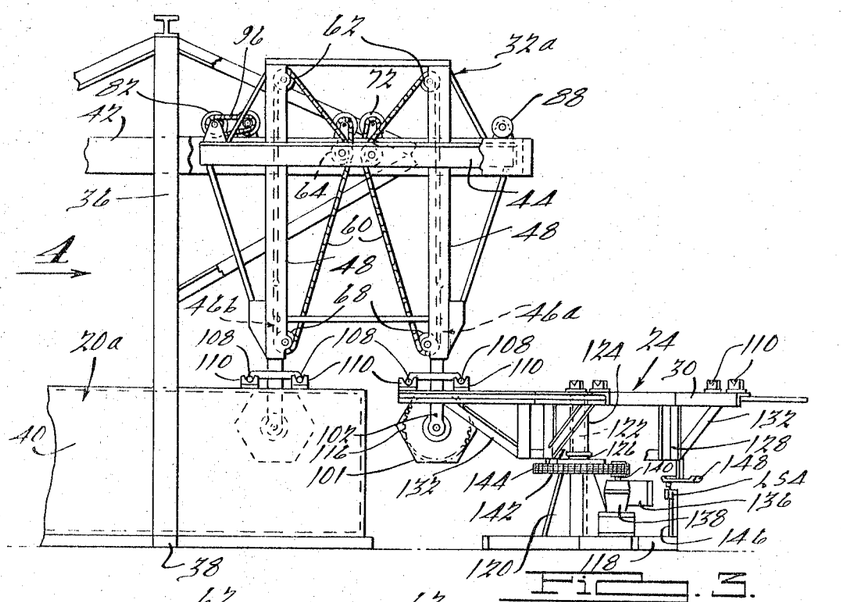
FIGURE 3 is a fragmentary side elevational view of the conveying machine and rotary end transfer section illustrated in FIGURE 2.
Figure 4:
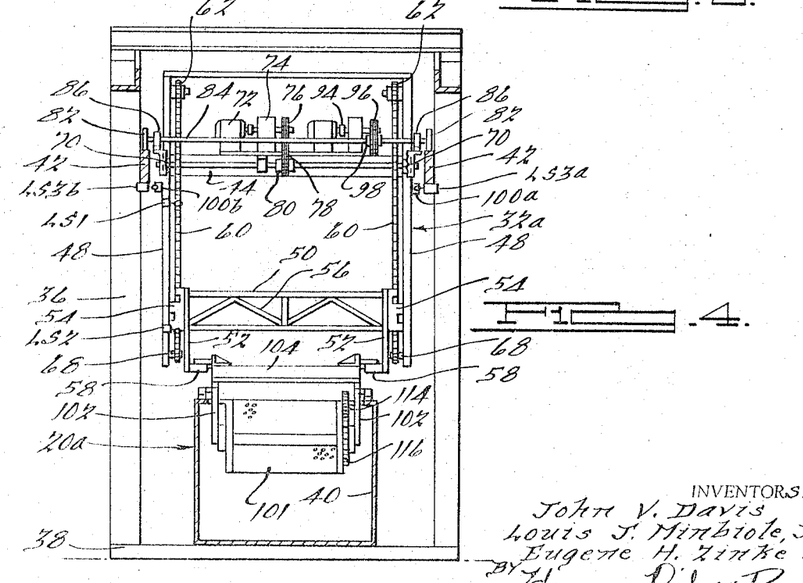
FIGURE 4 is an end elevation view of the carriage on the straight-line machine section shown in FIGURE 3 as viewed in the direction of the arrow indicated at 4.

The structural features of the conveying apparatus will now be described with particular reference to FIGURES 2–5 of the drawings. FIGURES 2–4 illustrate an enlarged fragmentary view of the conveying machine section 20a and the rotary load-unload transfer mechanism 24 illustrated in the conveying machine arrangement shown in FIGURE 1. Since each of the conveying machine sections 20a, 20b and 20c, and the rotary transfer mechanisms 22, 24 are substantially the same, a detailed description of one of the machine sections and one of the rotary transfer mechanisms is sufficient for obtaining a complete understanding of the structural features of the entire conveying apparatus. In the specific embodiment of the conveying machine as illustrated in FIGURES 2-5, the straight-line machine section 20a comprises a series of longitudinally spaced inverted U-shaped frames 36 which are connected at their lower ends to transverse base beams 38 which form a suitable platform for supporting a series of aligned treating receptacles 40. A pair of longitudinally extending rails 42 are rigidly affixed to the upper inner portions of the upright side columns of the frames 36 on which the shuttle carriage 32a is movably mounted for movement over the aligned series of treating receptacles 40.

The shuttle carriage 32a comprises a rectangular framework 44 which serves as a platform on which the drive means for the carriage and for the lift assemblies thereon is mounted. In the exemplary shuttle carriage illustrated in the drawings, two lift mechanisms 46a, 46b are provided, although it will be appreciated that only one or more than two such lift mechanisms can be incorporated to provide the desired lifting sequence and capacity of the conveying machine section. It will also be understood that more than one shuttle carriage can be provided along each machine section which are coordinated in operation to provide an appropriate transfer of the work racks through the treating stations. Each lift mechanism comprises a pair of transversely disposed substantially parallel vertical guide members 48 between which a lift member 50 is slidably disposed and movable to and from a raised position and a lowered position. The lift member 50, as may be best seen in FIGURES 4 and 5, comprises a pair of end members 52 to the outer faces of which shoes 54 are affixed, which in turn are disposed in sliding relationship along the vertical guide members 48. The end members 52 are rigidly secured to each other by a truss-type framework 56 extending therebetween. The lower inner faces of each of the end members 52 are provided with an engaging lug 58 which in the specific embodiment shown is of a V-shaped cross section for engaging an appropriate projection at each side of a work rack enabling its support from the lift member and the transfer of the work rack from one station to another in response to the longitudinal movement of the carriage.

Figures 5, 6:
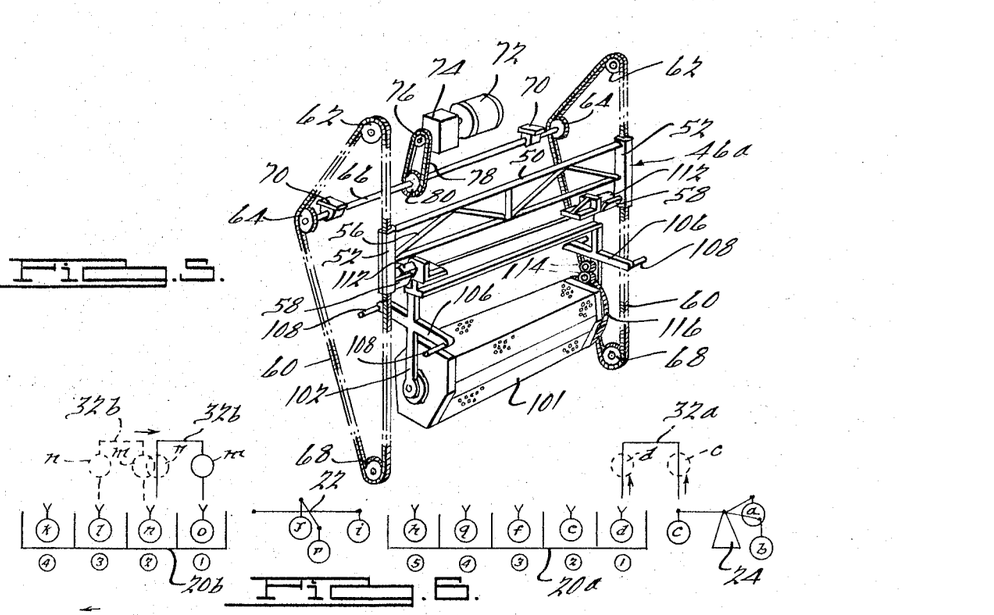
FIGURE 5 is a perspective fragmentary view of one lift member and the driving means therefore on the carriage and a typical work rack suspended thereon.
FIGURES 6-14 are schematic side elevation views of two straight-line sections interconnected by a four-station rotary transfer mechanism and having a rotary transfer mechanism at one end of one of the sections and further illustrating the sequential operation of each of the units and the coordinated movement of the work racks transferred thereby.

Movement of the lift members 50 to and from a raised position and a lowered position is achieved by means of a pair of continuous lift elements or chains 60 as best seen in FIGURES 4 and 5, having the ends thereof securely fastened to the upper and lower ends, respectively, of each of the end members 52. Each of the lift chains 60 extends upwardly and is trained over an idler sprocket 62 affixed to the upper end of the vertical guide member 48, and thereafter is trained around a driving sprocket 64 affixed to the ends of a cross shaft 66 extending transversely of the shuttle carriage. The lower portion of the chain is trained about an idler sprocket 68 rotatably secured to the lower end portion of each of the vertical guide members 48.

As best seen in FIGURES 4 and 5, the cross shaft 66 is rotatably supported in bearings 70 affixed to the underside of the rectangular framework 44. Driving rotation of the cross shaft 66 and the driving sprockets 64 at each end thereof is achieved by a reversible motor 72 supported on the rectangular framework 44. The reversible lift motor 72 is preferably drivingly coupled to a suitable gear reducer 74 on the output shaft of which a drive sprocket 76 is mounted around which a drive chain 78 is trained and which extends around a driven sprocket 80 affixed to the central portion of the cross shaft 66. It will be apparent from the foregoing arrangement that energization of the reversible lift motor 72 effects rotation of the cross shaft 66 in either direction with a corresponding lifting or lowering movement of the lift member 50.

Energization of each of the reversible lift motors 72 effecting independent vertical movement of the two lift members 50 of the lift mechanisms 46a, 46b is achieved in accordance with a central control system which provides for coordinated movement of each of the shuttle carriages and the rotary transfer mechanisms in a manner subsequently to be described. In order to signal the central control circuit when a lift member 50 has attained the fully elevated position, an up-position limit switch LS1, as shown in FIGURE 4, is mounted on one of the vertical guide members 48 and is adapted to be actuated by one of the end members 52 when the lift member attains the elevated position. Similarly, deenergization of the reversible lift motor 72 is achieved in response to the tripping of down-position limit switch LS2 as indicated in FIGURE 4, when the lift member attains the fully lowered position and in which position the engaging lugs 58 are in vertical and horizontal clearance relationship relative to the corresponding lugs on the work rack. The limit switches LS1 and LS2 are interlocked in the principal control circuit to prevent translatory movement of the shuttle carriage before either or both of the lift members thereon have attained the prescribed elevated or lowered position.

Movement of the shuttle carriage 32a along the rails 42 above the series of treating receptacles or tanks 40 is achieved by a pair of drive rollers 82 mounted on the ends of a drive shaft 84 supported in bearings 86 affixed to the rectangular framework 44 as best seen in FIGURE 4. A second pair of idler rollers 88, as shown in FIGURE 3, is rotatably mounted on the other end of the shuttle carriage for movably supporting the carriage on the rail 42. Rotation of the drive shaft 84 and movement of the shuttle carriage is achieved by a reversible drive motor 90 mounted on the platform formed by the rectangular framework 44 which is drivingly coupled to a suitable gear reducer 92 by means of a flexible element such as a drive belt 94. A drive sprocket is affixed to the output shaft of the gear reducer 92 around which a drive chain 96 is affixed and is trained around a driven sprocket 98 affixed to the drive shaft 84. Accordingly, rotation of the drive motor 90 in opposite directions effects translatory movement of the shuttle carriage in either of two directions along the supporting rails 42.

The controlled energization of the reversible drive motor 90 and movement of the shuttle carriage in the proper direction along the supporting rails 42 is achieved in accordance with the central control circuit. Deenergization of the drive motor and a stoppage of the shuttle carriage is achieved when the appropriate lift member 50 of either of the lift mechanisms 46a, 46b is disposed in longitudinal alignment with the rack-supporting means at a work station therebelow. In the exemplary embodiment shown in the drawings, and particularly in FIGURE 4, appropriate alignment of the lift mechanisms on the carriage relative to the treating stations is achieved by a series of station limit switches LS3a and LS3b mounted, respectively, on the rails 42 in longitudinally spaced increments which are adapted to be tripped by actuators 100a, 100b, respectively, on the shuttle carriage when the lift mechanisms 46a, 46b, respectively, are disposed in appropriate vertical alignment with the rack-supporting means at a selected treating station. Alternative suitable sensing means such as magnetic or photoelectric sensors, for example, can also be satisfactorily employed which can be selectively energized to effect the stoppage of the shuttle carriage with one of the lift mechanisms thereon disposed in appropriate alignment relative to a preselected treating station.

Each of the station limit switches LS3a, LS3b is electrically connected to the central control circuit of the conveying machine and is selectively energized thereby in accordance with the preselected sequence so that upon actuation thereof by the actuators 100a, 100b, respectively, the drive motor 90 is deenergized, stopping the carriage at the appropriate station. It will be apparent that during the travel of the shuttle carriage, all or a portion of the station limit switches are tripped by the actuators 100a, 100b. However, since only one of the selected station limit switches is energized, the actuation of the deenergized switches does not effect the transfer movement of the shuttle carriage. Accordingly, when the lift mechanism 46a, for example, is to be aligned with a treating station, the appropriate station limit switch LS3a at that station is energized and the carriage commences its movement toward that station and is halted in response to the tripping of that station limit switch by the actuator 100a on the carriage. Conversely, when the lift mechanism 46b is to be employed, the appropriate station limit switch LS3b is energized and the carriage is halted when the actuator 100b trips that station limit switch.

The actuation of the appropriate energized station limit switch not only serves to halt the carriage with its appropriate lift mechanism in vertical alignment with a work rack or work rack supporting means at that station, but additionally serves to communicate to the central control circuit that the shuttle carriage has arrived at the selected treating station whereupon energization of the appropriate lift motor can take place, effecting either a lifting or a lowering of a work carrier above that treating station. It will be apparent that up-position and down-position limit switches LS1, LS2, and the station limit switches LS3a, LS3b are interlocked, whereupon actuation of each switch in appropriate sequence is necessary before the next operating phase of the process cycle can commence. This interlock relationship will be described in greater detail in a later portion of the specification.

It will be understood that in lieu of the specific lift mechanisms and drive mechanism for effecting translatory movement of the shuttle carriage, alternative suitable drive arrangements can be satisfactorily employed including rack and pinion drive systems, hydraulic lift mechanisms, or the like, to achieve equivalent movement of the carriage and the lift members thereon. It will also be appreciated that the particular form of the engaging lugs 58 on the lift members 50 will vary depending on the specific type of rack to be engaged and supported thereby. In the exemplary embodiment of the machine shown in the drawings, the work racks 34 comprise a barrel-type unit for processing small workpieces in bulk. The rack 34, as may be best seen in FIGURES 4 and 5 is of a type well known in the art including a perforated barrel 101 of a polygonal cross-sectional shape which is rotatably supported at its ends from a pair of vertical arms 102 which are interconnected along their upper ends by a beam 104. A cross member 106 is affixed to the upper end portions of each of the arms 102 to which a pair of outwardly extending pins 108 are affixed and which are adapted to be engaged by and seated within V-shaped saddles 110 mounted above each of the treating stations.

The V-shaped saddles 110 mounted at certain treating stations may be electrically charged which in turn effect electrification of the workpieces within the barrel 101 by a suitable conductor connected to one of the pins 108 in a manner well known in the art to provide for an electrochemical or electroplating operation on the workpieces at that station.

An outwardly extending lug 112 is affixed to the upper end of the arms 102 which are of a square-shaped cross section and are adapted to be removably supported by the V-shaped engaging lugs 58 formed on the end members 52 of each of the lift members 50. Rotation of the barrel 101 while it is immersed in a treating solution contained in a treating receptacle 40 may satisfactorily be achieved such as, for example, by a series of gears 114 as best seen in FIGURES 4 and 5, mounted on an arm 102 and disposed in meshing engagement with a gear 116 affixed to one end of the barrel 101. Suitable drive means may be provided at the treating station for engaging the gears 114 and effecting driving rotation of the barrel as desired.

The rotary load-unload transfer mechanism 24 disposed in operative relationship with one end of the machine section 20a as illustrated in FIGURES 2 and 3 consists of a platform 118 on which a pedestal 120 is mounted above which a tubular shaft 122 extends. A flanged pipe 124 is rotatably positioned on the tubular shaft 122 and is separated from the pedestal by means of a thrust bearing 126. A triangular framework 128 is rigidly affixed to the flanged pipe 124 from the corners of which three pairs of spaced legs 130 extend in spaced substantially parallel relationship. Each pair of legs defines a work-supporting station and the stations are disposed with their centers at an angular interval of 120°. The legs 130 are rigidly supported in a substantially horizontal position by means of angular braces 132 extending between the triangular framework 128 and the underside of each of the legs 130. A pair of V-shaped saddles 110 are fixed to the upper surface of each of the legs for the purposes of supporting the pins 108 on the barrel-type work carriers 34. Further rigidification of the legs 130 is achieved by arcuate braces 134 as best seen in FIGURE 2 which extend between and are affixed to the outer end portions of adjacent legs of adjacent stations.

Incremental rotation of the flanged pipe 124, triangular framework 128 connected thereto and the three pairs of spaced legs 130 is achieved by a drive motor 136 drivingly coupled to a gear reducer 138 which is provided with a drive sprocket 140 on the output shaft thereof. A driven sprocket 142 in the form of an annular ring is affixed to the underside of the triangular framework 128. A continuous drive chain 144 is trained around the drive sprocket 140 and driven sprocket 142. Accordingly, energization of the drive motor 136 effects a corresponding rotation of the rotary transfer mechanism and a circular travel of the work racks supported thereon.

Energization of the drive motor 136 is achieved in accordance with the sequential operation provided by the central control circuit and in coordinated relationship with the movement of the shuttle carriage 32a on the adjacent machine section 20a. Deenergization of the drive motor is achieved in accordance with the exemplary embodiment shown by means of a limit switch LS4 mounted on the upper end of a bracket 146 secured to the platform 118 which is adapted to be tripped by an actuator 148 depending from one angular brace 132 of each of the pairs of spaced legs 130. The relative disposition between the actuator 148 and the limit switch LS4 is arranged so that the drive motor is deenergized when one of the pair of spaced legs 130 is moved into a position in end alignment with the input end of the machine section 20a. In this position the work carrier supported on the rotary transfer mechanism is in a position for engagement by either of the lift mechanisms on the shuttle carriages as well as in a position to receive a work rack which has completed the treating sequence. A reenergization of the drive motor 136 does not occur until the shuttle carriage has undergone a preselected cycle as controlled by the central control circuit.

It will be appreciated that the specific rack-supporting means incorporated on the rotary transfer mechanism will vary consistent with the specific type of work rack which is being employed in the processing machine. It will also be understood that the number of treating stations, or work-supporting stations on the rotary transfer mechanism can be varied from the three as shown in FIGURES 2 and 3 to also include mechanisms having two, or four, corresponding to the rotary transfer mechanism 22 shown in FIGURE 1, as well as more than four in accordance with the specific machine arrangement desired. In each case a limit switch LS4 is provided and an actuator is provided for each station so as to halt rotation of the rotary transfer mechanism when it has moved to a position wherein the next rack-supporting station is disposed in end alignment with the adjacent end of a straight-line machine section.

A typical operating sequence of the conveying machine will now be described with particular reference to the sequence diagrams illustrated in FIGURES 6 through 14, inclusive. In the schematic arrangement diagrammatically illustrated, a load-unload rotary transfer mechanism 24 is provided with three rack-supporting stations and is disposed at one end of a five-station straight-line conveying machine section indicated at 20a corresponding to the general arrangement as illustrated in FIGURE 1. In addition, a four-station rotary transfer mechanism 22 is disposed between the output end of the machine section 20a and the input end of the machine section 20b which also corresponds to the general arrangement illustrated in FIGURE 1. For the purposes of clarity, the machine section 20c has been omitted. In lieu of the machine section 20c, a suitable shop conveyor may be provided which is operative to selectivity remove some of the work racks positioned transversely between the ends of the two conveying machine sections and transfer them through an alternative treating sequence as desired. Suffice it to say, the general arrangement as illustrated in FIGURES 6 through 14, inclusive, is believed sufficient to illustrate a typical coordinated operating relationship between the several components comprising the conveying apparatus.

The machine section 20a contains five aligned treating stations numbered 1 through 5, consecutively, through which the work racks are transferred in a cell-type processing sequence. A cell-type processing sequence is one wherein each of the treating stations is considered a separate treating cell and the work racks are immersed in only one cell of the machine section, after which they are transferred for further processing in a next adjacent machine section. In comparison, the machine section 20b, as illustrated, consists of four consecutive treating stations numbered 1 through 4, inclusive, which for the purpose of illustration are employed in a sequential processing sequence wherein the work racks are sequentially transferred from station 1 to station 2, to station 3, and finally to station 4, from which they are removed and returned to the rotary transfer mechanism 22. The alternative processing arrangements of the two machine sections in combination with the coordinated operation of the two rotary transfer mechanisms 22 and 24 are provided to further illustrate the extreme processing flexibility and versatility provided by the conveying apparatus comprising the present invention.

The operating sequence of the conveying apparatus as illustrated in FIGURES 6 through 14 can best be described by first considering the operative relationship between the rotary load-unload transfer mechanism 24 and the shuttle carriage 32a on the machine section 20a. As shown in FIGURE 6, the shuttle carriage 32a is positioned with one of its lift mechanisms above the work rack c supported on the rotary transfer mechanism 24 and with the other lift mechanism thereof disposed above rack d in treating station 1. In this position the central control circuit effects an energization of the two lift drive motors whereupon the lift members engage work racks c and d effecting a movement thereof from the position as shown in solid lines to the elevated position as shown in phantom in FIGURE 6. When the lift mechanisms attain the fully elevated position as signalled by the tripping of up-position limit switches LS1 of each lift mechanism, the central control circuit effects energization of the carriage drive motor whereupon it is moved from the position shown in FIGURE 6 to the position shown in FIGURE 7. The shuttle carriage 32a is halted in response to the tripping of an appropriate station limit switch LS3 wherein the work carrier c is disposed in vertical alignment above the rack supports at cell station 1. Upon the tripping of the station limit switch indicating the arrival of the carriage at the appropriate station, the lift mechanism is energized effecting a deposition of the work carrier c into the treating solution at station 1 as indicated in phantom.

Figure 7:
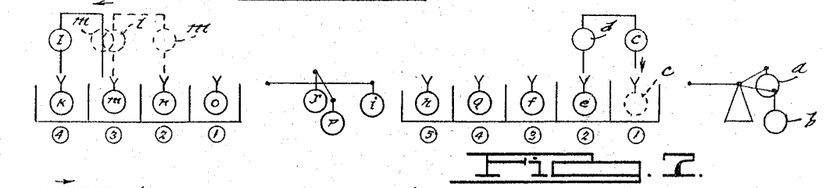
Figure 8:
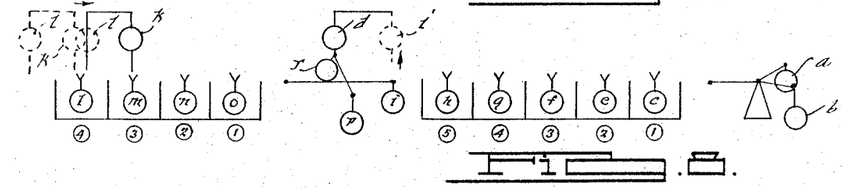
Figure 9:
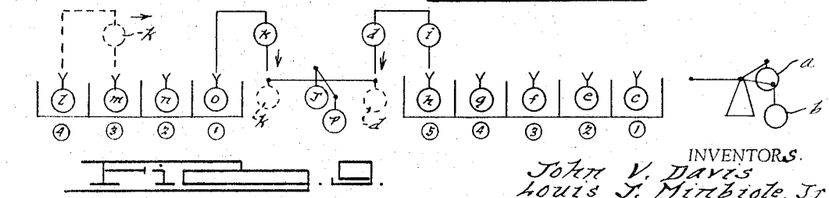

In response to the tripping of down-position limit switch LS2 by the lift mechanism, the central control circuit effects energization of the drive motor causing the shuttle carriage to move from the position shown in FIGURE 7 to the position as shown in FIGURE 8. The lift member of the lift mechanism remains in the lowered position and accordingly becomes positioned beneath work rack i supported at a work-rack supporting station in alignment with the output end of machine section 20a. In this position, in response to the signaling of station limit switch LS3, the lift mechanism is elevated causing work rack i to be moved to the elevated position as shown in phantom in FIGURE 8. Thereafter, the shuttle carriage is moved from the position as shown in FIGURE 8 to the position shown in FIGURE 9 in which the work rack d is disposed above and in vertical alignment with the rack-supporting station of the rotary transfer mechanism 22. The lift mechanism is then energized effecting a lowering of the rack d on the rotary transfer mechanism 22 as shown in phantom in FIGURE 9. Accordingly, the workpieces contained in the work rack d which have undergone a preselected cell type treatment in the machine section 20a are now transferred to a next successive treating cycle. At the same time the work rack i which has completed the treating sequences is transferred by the shuttle carriage 32a from the position shown in FIGURE 9 to the position shown in FIGURE 10 wherein it is deposited on the vacated station of the rotary transfer mechanism 24 as indicated in phantom.

Figure 10:
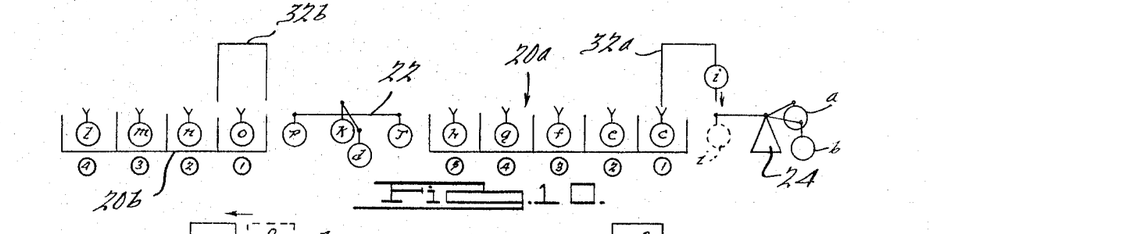
Figure 11:
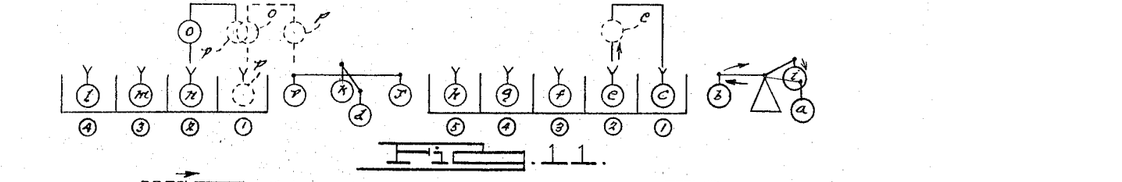
Figure 12:
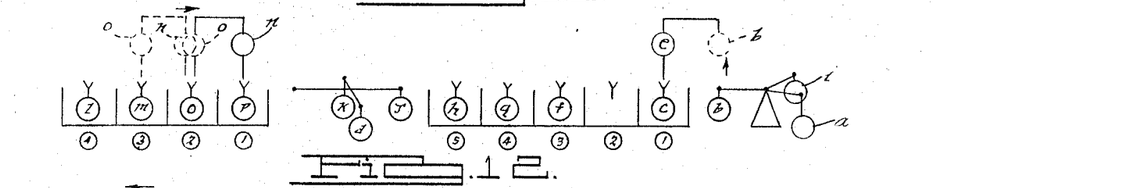

As will be further noted in FIGURE 10, after the shuttle carriage 32a has moved to a clearance position relative to the rotary transfer mechanism 22, the rotary transfer mechanism 22 is rotated through an angularity of about 90° wherein the work rack d is replaced by a work rack j that is now disposed in end alignment with the output end of the machine section 20a. Similarly, as illustrated in FIGURE 11, after the work rack i has been deposited on the rotary transfer mechanism 24 and the shuttle carriage 32a has moved to a clearance position relative thereto, the rotary transfer mechanism 24 is energized, transferring the rack i to a suitable unload station from which the workpieces can be removed. After the deposition of the work rack i, the shuttle carriage again proceeds to remove a second rack such as the work rack e from station 2, as illustrated in FIGURE 11, followed by the removal of a work rack b containing freshly loaded workpieces from the rotary transfer mechanism as illustrated in FIGURE 12. The shuttle carriage 32a thereafter moves to a position shown in FIGURE 13 wherein the work rack b is lowered into the newly vacated treating cell 2, and thereafter the shuttle carriage moves from the position shown in FIGURE 13 to the position shown in FIGURE 14 wherein the work rack j is removed from the rotary transfer mechanism 22. This sequence continues with the deposition of the work rack e at the newly vacated position on the rotary transfer mechanism 22 formerly occupied by the rack j and in turn the transfer and deposition of the rack j containing fully processed workpieces on the vacated position of the rotary transfer mechanism 24.

Operating in coordinated relationship with the shuttle carriage 32a of the machine section 20a and with the rotary transfer mechanism 22 is the shuttle carriage 32b of machine section 20b, which now will be described in connection with FIGURES 6 through 14, inclusive. The sequence may best be illustrated commencing with the position of the shuttle carriage 32b as illustrated in FIG- URE 10 in which it is disposed in a standby position awaiting the completion of the rotary transfer movement of the rotary transfer mechanism 22. Thereafter, the shuttle carriage 32b moves from the position shown in FIGURE 10 to the position shown in phantom in FIGURE 11 wherein the work rack p is removed from the rotary transfer mechanism and, concurrently, the work rack o is removed from the first station of machine section 20b. The shuttle carriage 32b thereafter is moved from the position as shown in phantom in FIGURE 11 to the position as shown in solid lines in FIGURE 11 wherein the work rack p is deposited at station 1 as illustrated in phantom.

After the deposition of the work rack p the shuttle carriage 32b moves from the position as shown in solid lines in FIGURE 11 to the position as shown in phantom in FIGURE 12 wherein the work rack n is withdrawn from treating station 2 and the shuttle carriage thereafter is advanced from the position as shown in phantom in FIGURE 12 to the position as shown in solid lines wherein the work rack o is deposited in station 2 newly vacated by work rack n.

Figures 13, 14:
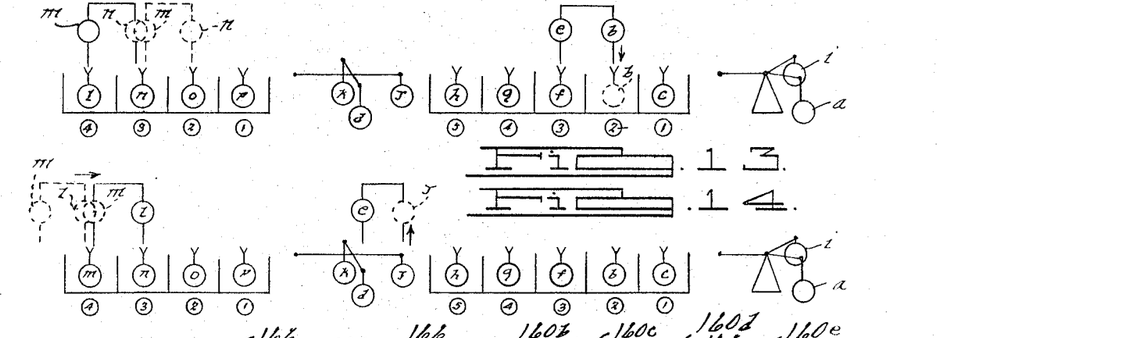

After work rack o has been deposited, the shuttle carriage 32b is moved from the position as shown in solid lines in FIGURE 12 to the position as shown in phantom in FIGURE 13 wherein work rack m is withdrawn from treating station 3 after which the shuttle carriage is moved from the position as shown in phantom in FIGURE 13 to the position as shown in solid lines in FIGURE 13 whereupon work rack n is deposited at station 3 formerly occupied by work rack m. This sequence continues as illustrated in FIGURES 14 and 6 whereupon the work rack e is withdrawn from station 4 and replaced by work rack m and thereafter work rack l is redeposited on the vacated supporting station of the rotary transfer mechanism 22. This latter operation is typified by FIGURE 9 wherein during the prior cycle work rack k withdrawn from station 4 is deposited on a vacated rack-supporting station of the rotary transfer mechanism 22.

It will be apparent from the foregoing operating sequence that coordinated movement of the work racks through the several straight-line machine sections and the interchange thereof by means of the rotary transfer mechanisms is accurately coordinated by way of the central control circuit which is interlocked with the several limit switches controlling the movement of the shuttle carriage, the lift mechanisms thereon, and the rotary transfer movement of the several transfer mechanisms.

The coordinated operation of the shuttle carriages of each of the machine sections and of the rotary transfer mechanisms interconnecting the several machine sections is automatically controlled by suitable sequencing means incorporated in the central control circuit which is electrically connected to the up-position and down-position lift mechanism limit switches LS1 and LS2 of each carriage in addition to each of the station limit switches LS3a, LS3b, at each station of each machine section in addition to the limit switches LS4 on each of the rotary transfer mechanisms. The foregoing switching devices are interlocked in the central control circuit and are selectively energized by the sequencing means which also effect selected energization of the reversible lift motors on each of the shuttle carriages as well as the drive motors for effecting translatory movement of the shuttle carriages along the supporting rails. Intermittent energization of the drive motors on each of the rotary transfer mechanisms is also achieved in coordinated relationship relative to the movement of the shuttle carriage on the machine section adjacent thereto. The sequencing means for providing automatic sequential operation of the several shuttle carriages and the lift mechanisms thereon in combination with the several rotary transfer mechanisms may include one or combinations of stepping switches of the type employed in telephone circuitry or alternatively may comprise a sequencing drum of the general type shown in FIGURE 15.

Figure 15:
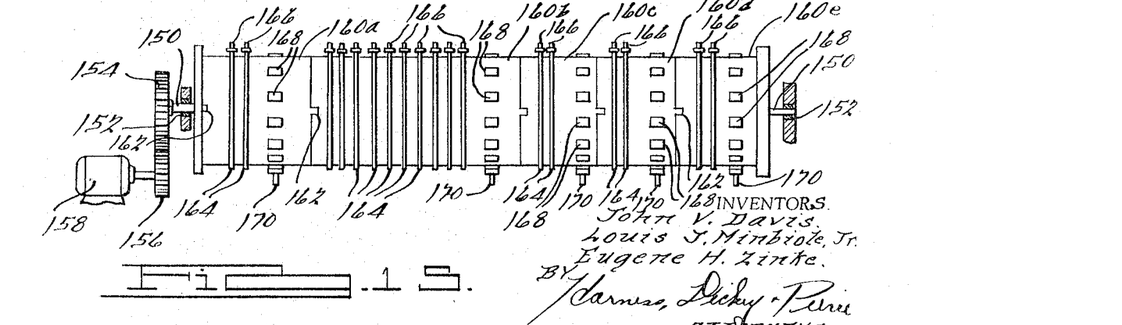
FIGURE 15 is a schematic plan view of a sequencing drum incorporated in the central control circuit for achieving a preselected sequentially phased operating cycle of each of the carriages and the lift mechanisms thereon as well as a corresponding periodic angular movement of the several rotary transfer mechanisms.

The sequencing drum as shown in FIGURE 15 is provided with two axially extending shafts 150 which are rotatably journaled in suitable bearings 152. To one end of one of the shafts 150 a driven gear 154 is affixed which is disposed in constant meshing engagement with a driving gear 156 which in turn is drivingly coupled to a motor 158 for effecting intermittent rotation of the drum. Around the periphery of the drum a series of sleeves indicated at 160a, 160b, 160c, 160d, and 160e are removably mounted and are interlocked to each other and to the drum by coacting grooves and notches indicated at 162 to maintain the several sleeves in appropriate circumferential position on the drum. Each of the several sleeves incorporates one or more contact rings 164 extending therearound which are disposed in constant wiping electrical contact with contact brushes 166. Each of the sleeves is also provided with a plurality of spaced contacts 168 which are disposed in circumferentially spaced relationship around the sleeve and which are electrically connected to selected ones of the contact rings on the sleeve disposed adjacent thereto. A stationary contact brush 170 is disposed adjacent to the spaced contacts 168 along each of the sleeves 160a, 160b, 160c, 160d and 160e for effecting energization of a selected relay in a manner well known in the art in the central control circuit in accordance with the particular spaced contact with which the contact brush is in electrical contact.

In accordance with the relationship shown in FIGURE 15, intermittent rotation of the sequence drum effects a preselected successive contact between the stationary contact brushes 170 and the spaced contacts 168, effecting a preselected energization of the station limit switches, the shuttle carriage drive motor, the reversible lift motors, and the drive motor of the rotary transfer mechanism. In the exemplary arrangement shown in FIGURE 15, satisfactory sequential control can be achieved between the shuttle carriage 32a on the machine section 20a and of the load-unload rotary transfer mechanism 24 as illustrated in FIGURES 2 and 3 and in accordance with the sequence illustrated in FIGURES 6 through 14. For example, the sleeve 160a is operative to selectively energize the shuttle carriage transfer motor effecting rotation thereof in either one or two directions for effecting movement of the shuttle carriage along the supporting rails in the desired direction. The sleeve 160b is operative to energize the appropriate one of the station limit switches LS3a, LS3b in accordance with the spaced contact 168 with which the stationary contact brush 170 is disposed in electrical contact which in turn is connected to one of the contact rings 164. The sleeves 160c and 160d are operative to selectively energize, respectively, the two reversible lift motors on the shuttle carriage in accordance with a preselected sequence effecting a lifting or lowering of the work racks out of or into a selected treating station. The contact sleeve 160e is operative to selectively energize the drive motor of the rotary transfer mechanism to effect an arcuate transfer movement thereof into and out of a position in end-aligning relationship with the end of the machine section 20a, as hereinbefore described. The several latching relays and other relays electrically connected to the several stationary contact brushes include contacts which are interlocked with the other circuits as well as the drive motor 158 for the sequence drum to assure the completion of one operating cycle before the next operating cycle is commenced. For example, energization of one or both of the reversible lift motors on the shuttle carriage does not commence until the appropriate station limit switch has been actuated by the shuttle carriage communicating to the central control circuit that the shuttle carriage is in the appropriate position. Similarly, movement of the shuttle carriage does not commence until either the up or down position limit switches of each lift mechanism has been tripped, signaling that the lift member and the work rack has either attained the fully elevated position or had been deposited at a treating station. At the completion of a preselected cycle, the sequencing drum is indexed by the motor 158 effecting movement thereof to the next series of spaced contacts 168 at which point the next operating cycle of the machine commences.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A conveying apparatus comprising an aligned first section and an aligned second section disposed with one of each of the ends thereof in proximate relationship and interconnected at said ends by a rotary transfer mechanism, said transfer mechanism including a plurality of work rack supporting means thereon, and drive means for intermittently rotating said supporting means into successive end alignment with the adjacent said ends of said first and said second sections, each said section including rail means extending longitudinally along a series of treating stations, a carriage movably mounted on said rail means, lift means on said carriage for engaging and vertically moving the work racks above the treating stations and said work rack supporting means on said transfer mechanism when disposed in end alignment therewith, means for intermittently moving each said carriage along said rail means, and control means for coordinating the movement of each said carriage and said lift means thereon, and the rotary movement of said transfer mechanism for successively aligning said rack supporting means on said transfer mechanism with said ends of said first and said second section for receiving work racks from and for transferring work racks to said lift means on each said carriage.

2. A conveying apparatus comprising an aligned first section and an aligned second section disposed with one of each of the ends thereof in proximate relationship and interconnected at said ends by a rotary transfer mechanism, said transfer mechanism including a rotatably mounted frame defining a plurality of circumferentially spaced work rack supporting means therearound, and drive means for intermittently rotating said frame for successively moving said supporting means into end alignment with the adjacent said ends of said first and said second section, each said section including rail means extending longitudinally along a series of treating stations, a carriage movably mounted on said rail means, lift means on said carriage for engaging and for vertically moving the work racks above the treating stations and said work rack supporting means on said transfer mechanism when disposed in end alignment therewith, means for intermittently moving each said carriage along said rail means, and control means for coordinating the independent movement of each said carriage and said lift means thereon and the intermittent arcuate movement of said transfer mechanism for successively aligning said rack supporting means on said transfer mechanism with said ends of said first and said second section for receiving work racks from and for transferring work racks to said lift means on each said carriage.

3. A conveying apparatus comprising an aligned first section and an aligned second section disposed with one of each of the ends thereof in proximate relationship and interconnected at said ends by a rotary transfer mechanism, said transfer mechanism including a rotatably mounted frame defining a plurality of equal circumferentially spaced work rack supporting means therearound, drive means for intermittently rotating said frame and said supporting means thereon into successive end alignment with the adjacent said ends of said first and said second section, and sensing means for stopping said frame when said supporting means thereon are disposed in appropriate end alignment with said ends of each said section, each said section including rail means extending longitudinally along a series of treating stations, a carriage movably mounted on said rail means, a plurality of lift means on said carriage for engaging and vertically moving the work racks above the treating stations and said work rack supporting means on said transfer mechanism when disposed in end alignment with said section, drive means for independently and intermittently moving each said carriage along said rail means, and control means including said sensing means operable in response to the movement of each said carriage and said lift means thereon for coordinating the arcuate movement of said transfer mechanism for successively aligning each said rack supporting means thereon with said ends of said first and said second section for receiving work racks from and for transferring work racks to said lift means on each said carriage.

4. An electroplating system for conveying work racks through a preselected electroplating sequence comprising rotary means for intermittently moving work racks supported thereon in a circular direction to successive arcuately spaced positions, a plurality of aligned series of treating stations disposed with one end of each thereof positioned contiguous to the path of movement of said work racks on said rotary means and in alignment with one of said arcuately spaced positions, conveying means on each said aligned series of treating stations for independently conveying the work racks from one end of the treating stations to the other end thereof, and means for transferring work racks to and from said rotary means when disposed in alignment with the adjacent end of each said aligned series of treating stations to said conveying means therealong for transfer through said treating stations.

References Cited by the Examiner

UNITED STATES PATENTS

| | | | |
|---|---|---|---|
| 2,328,050 | 8/1943 | Bullard | 134—67 |
| 2,554,118 | 5/1951 | Moser | 214—89 X |
| 2,958,330 | 11/1960 | Huenerfauth | 214—89 X |
| 3,148,631 | 9/1964 | Gorjanc | 104—88 |
| 3,207,337 | 9/1965 | Abbey | 214—89 |

GERALD M. FORLENZA, *Primary Examiner.*

ALBERT J. MAKAY, *Examiner.*